United States Patent
Rudel

[15] 3,700,001
[45] Oct. 24, 1972

[54] CHECK VALVE

[72] Inventor: Kurt Rudel, Bremen, Germany

[73] Assignee: Gustav F. Gerdts KG, Bremen, Germany

[22] Filed: Sept. 1, 1970

[21] Appl. No.: 68,685

[30] Foreign Application Priority Data

Sept. 4, 1969 Germany..........P 19 44 774.6

[52] U.S. Cl............................137/543.21, 137/515.7
[51] Int. Cl..........................F16k 15/02, F16k 17/04
[58] Field of Search...137/515, 515.5, 515.7, 516.21, 137/535, 540, 543.19, 543.21

[56] References Cited

UNITED STATES PATENTS

| | | |
|---|---|---|
| 3,415,271 | 12/1968 | Maasberg et al..137/543.19 X |
| 3,412,931 | 11/1968 | Palmer...................251/368 X |
| 3,228,419 | 1/1966 | Smith et al................137/540 |
| 2,670,759 | 3/1954 | St. Clair....................137/540 |
| R24,664 | 6/1959 | Goepfrich..............137/540 X |
| 3,086,544 | 4/1963 | Yost......................137/540 X |
| 3,580,273 | 5/1971 | Schwarz............137/543.21 X |
| 3,473,626 | 10/1969 | Toda et al.........137/543.19 X |

FOREIGN PATENTS OR APPLICATIONS

| | | |
|---|---|---|
| 718,653 | 11/1954 | Great Britain........137/543.21 |
| 195,483 | 5/1938 | Switzerland..........137/543.19 |

*Primary Examiner*—Alan Cohan
*Assistant Examiner*—David J. Zobkiw
*Attorney*—Richards & Geier

[57] ABSTRACT

A check valve adapted to be fixed between flanges of two pipes is provided with an annular casing and a valve plate guided by ribs and cooperating with a valve seat provided in the casing. A closure spring has a free end engaging a member provided in the casing. The invention is particularly characterized in that the valve casing consists of a metallic tubular body having at one end an annular member consisting of elastic material and serving as a valve seat and at the other end an annular member consisting of elastic material and serving as a spring support. The two annular members engage a spring and cooperate with a valve plate which also consists of elastic material.

1 Claim, 2 Drawing Figures

CHECK VALVE

DESCRIPTION OF THE INVENTION

This invention relates to a check valve of substantially flat structure which can be fixed between flanges of two pipes and which consists of an annular casing, a valve plate guided by ribs and cooperating with a valve seat provided in the casing and a closure spring having a free end engaging a support provided in the casing.

An object of the present invention is the provision of a valve of this type which is of simple construction, light weight and small measurements, so that it is suitable for cheap mass production.

Another object is to provide a valve of this type which does not have unpleasant rattling noises which are produced by existing valves when the valve plate is opened and closed.

Other objects of the present invention will become apparent in the course of the following specification.

Flatly constructed valves which are located between flanges are known in prior art. They consist entirely of a synthetic material and they operate quite quietly. It was found, however, that the casing of synthetic material cannot withstand the fixing pressure between the pipe flanges, so that it gives in after a short operational period, becomes leaky and therefore unusable.

In the accomplishment of the objectives of the present invention it was found desirable to make the valve casing of a metallic tubular body with opening edges upon one side of which is fixed an annular member of an elastic material serving as the valve seat, while upon the other side is fixed an annular member of elastic material serving as a spring support. Both annular members cooperate by means of a closure spring with a valve plate which also consists of an elastic material.

The metallic tubular body is of simple construction, can be cheaply manufactured and does not require any subsequent treatment. Its sharp edges are completely covered by the annular members serving as valve seat and spring support, consisting of an elastic material, preferably a plastic material. These annular members for valve seat and spring support can be produced particularly effectively by a spraying process and they contribute to the further lowering of weight and of manufacturing costs, particularly since their application to the casing does not require any special operational exertion, since when the valve is fixed the annular members are clamped between the round edges of the casing and the flanges of the pipe holding the valve.

According to a further embodiment of the present invention which was found most effective in actual practice, the valve casing is made of a metallic draw body the edges of which are bent into annular collars carrying the annular members of elastic material serving as valve seat and spring support, whereby it is advantageous that the collar of the valve casing upon the inflow side should be bent inwardly for receiving the annular member constituting the valve seat while the collar upon the outflow side should be bent outwardly for receiving the annular member constituting the spring support.

According to another particularly advantageous embodiment of the present invention the annular members are provided with extensions serving as holders by means of which they can be removably fastened to the collars of the valve casing. In this manner the valve is held together as a closed structural unit during transportation, storing and during fixing, for example, into a pipe conduit of a heating installation. Thus there are no special costs for the assembly of the valve. Preferably, the annular bodies fit tightly over the edges of the collars of the valve casing and hold them firmly.

According to a further feature of the present invention the annular members consisting of elastic material extend outwardly to form flat seals consisting of elastic material extend outwardly to form flat seals covering the front surfaces of the casing. Thus the annular members serve also as seals and make unnecessary the use of special sealing rings.

According to a further embodiment of the present invention rattling noises are prevented not only during closing but also during the opening of the valve plate by extending inwardly the annular member serving as spring support beyond the supporting surface, so that it forms there a counter surface for the stroke limiting stops provided upon the valve plate. These stops are made out of elastic material as one piece with the guiding ribs and the valve plate. The stroke limiting stops prevent the blocking of the windings of the coiled spring serving as the closure spring.

In this manner the use of a special damping body is avoided. Plastic material works upon plastic material and this has the result of effectively damping any noises during the opening stroke of the valve plate. Thus the spring support acts not only as a seal but also as damping means.

According to a further feature of the present invention the free ends of the guiding ribs of the valve plate serve as a support for the closing spring, while the stroke limiting stops provided upon the guiding ribs serve to center and guide the closing spring. Due to this construction a closing spring with the largest possible diameter can be used which will move close to the wall of the casing and thus constitutes a hardly measurable resistance for the flowing medium. According to a further feature of the present invention any possible friction of the closing spring against the wall of the casing is avoided by covering the coil of the closing spring located upon the guiding ribs against the wall of the casing by edge portions of the guiding ribs which are pulled upwardly at the free ends.

Obviously it is also possible to fix the annular members to the casing by a gluten.

The invention will appear more clearly from the following detailed description when taken in connection with the accompanying drawing showing by way of example only, a preferred embodiment of the inventive idea.

Figure 1:
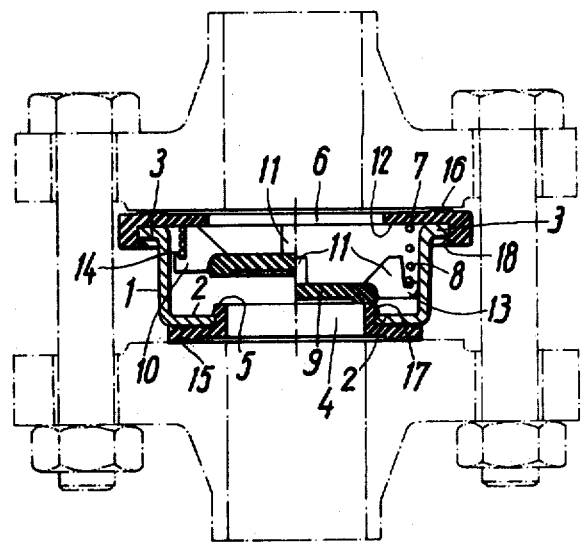
FIG. 1 shows two sections of the check valve, the left hand portion showing it in the open position and the right hand portion showing it in the closed position.
Figure 2:
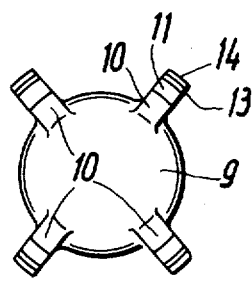
FIG. 2 is a plan view of the valve plate of the check valve.

As shown in the drawing, the valve consists of a drawn casing 1, the edges of which are shaped as an inwardly bent collar 2 and an outwardly bent collar 3. The collar 2 is engaged by an annular member 4 which constitutes the valve seat 5 and which is made of an elastic material, preferably a plastic material.

The collar 3 of the casing is engaged by an annular member 6 which also consists of an elastic material and which forms the support 7 for the closure spring 8.

A valve plate 9 cooperates with the valve seat 5 and is provided with guiding ribs 10 which provide a guide for the plate along the wall of the casing. The ribs 10 are provided with stroke limiting stops 11 which cooperate with a counter surface 12 produced by extending inwardly the spring support 7 of the annular member 6.

The free ends 13 of the ribs 10 carried by valve plate 9 serve as supports for the closing spring 8, while the stroke limiting stops 11 provide a side guiding for the closing spring 8 which in this embodiment is a cylindrical coiled spring. The winding of the closure spring 8 lying upon the ribs 10 is covered against the casing wall by an upwardly extending edge portion 14 in order to avoid friction between the wall of the casing and the spring.

The annular members 4 and 6 extend outwardly to flat seals 15 and 16 covering the front surfaces of the casing and also extend over the edges of the collars 2 and 3. The members 4 and 6 have extensions 17 and 18, respectively, which engage from below the edges of the collars 2 and 3. Due to this construction the annular members 4 and 6 can be easily removably fixed to the casing.

I claim:

1. A check valve adapted to be fixed between two tubular flanges, said check valve comprising a casing consisting of a metallic tubular body with open ends, one of said ends having a radially outwardly extending annular collar, the other end having a radially inwardly extending annular collar, an annular member consisting of elastic material and engaging said inwardly extending collar to constitute a flange seal, said annular member having a portion extending through the central opening of said inwardly extending collar into the interior of said casing, said portion removably holding said inwardly extending collar and constituting an inner container-like member, the free end of said portion located within said casing being a valve seat, a valve plate consisting of an elastic material and located within said casing, said valve plate being adapted to engage said valve seat, another annular member consisting of an elastic material and engaging said outwardly extending collar to constitute a flange seal, said other annular member having an edge portion outwardly enclosing said outwardly extending collar, whereby said other annular member is removably fixed to said outwardly extending collar, said other annular member having a portion extending over a portion of the open end of the casing and constituting a spring support, and a closure spring located within said casing and having one end engaging said spring support and another end engaging said valve plate.

* * * * *